UNITED STATES PATENT OFFICE.

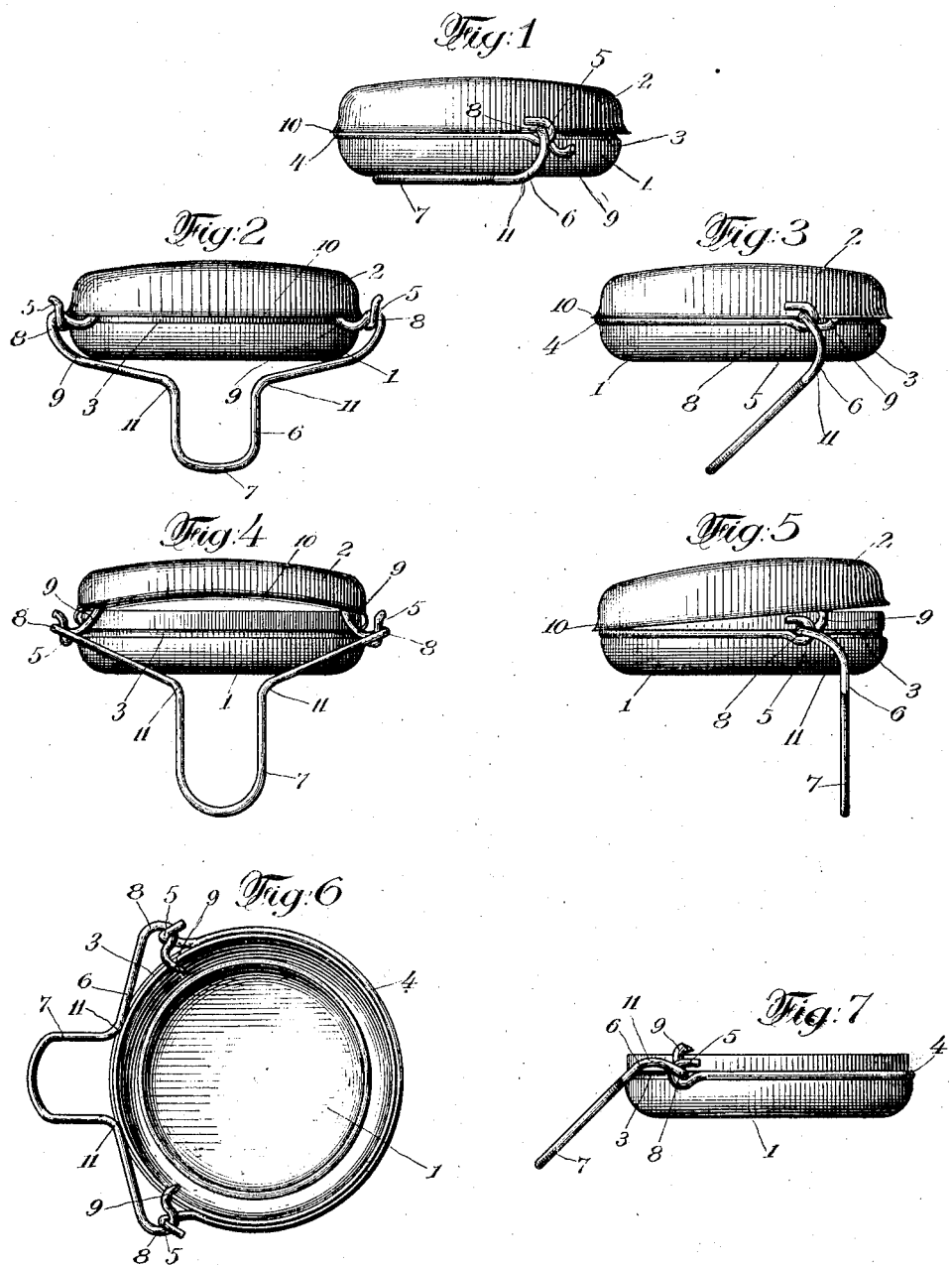

JOHN H. HOTSON, OF BROOKLYN, NEW YORK, ASSIGNOR TO S. M. BIXBY & COMPANY, OF NEW YORK, N. Y., A CORPORATION OF NEW YORK.

DEVICE FOR OPENING RECEPTACLES.

1,003,262.  Specification of Letters Patent.  Patented Sept. 12, 1911.

Application filed December 8, 1909. Serial No. 531,949.

*To all whom it may concern:*

Be it known that I, JOHN H. HOTSON, a citizen of the United States, and a resident of the borough of Brooklyn, county of Kings, and State of New York, have invented certain new and useful Improvements in Devices for Opening Receptacles, of which the following is a specification.

My invention relates to improvements in devices for opening receptacles and more especially to that class of devices in which the opening devices are arranged to be transported with the receptacle so that they may be always in readiness for operation.

One object of my invention is to provide a device of the class described which may be cheaply manufactured; which may be easily applied and removed to and from a can or other receptacle; which may be folded in such a manner as to occupy very little space when not in use and which also serves as a handle when the receptacle is in use.

Further objects, features and advantages will more clearly appear from the detailed description given below taken in connection with the accompanying drawing which forms a part of this specification.

Referring to the drawing, Figure 1 is a side view of a can or two-part receptacle showing my improved device in inoperative position thereon. Fig. 2 is a front vertical view of the receptacle and device in which the device is in position to remove the cover of the can. Fig. 3 is a view similar to Fig. 2, but taken at right angles to the same. Fig. 4 is a view similar to Fig. 2, but showing the device as it is forcing the cover off of the can or receptacle. Fig. 5 is a view similar to Fig. 4, but taken at right angles to the same. Fig. 6 is a top plan view of the device or receptacle with the cover removed. Fig. 7 is a view similar to Fig. 6, but taken at right angles to the same.

Referring to the various figures, 1 represents the body of a can or two-part receptacle and 2 its cover. The receptacle shown is especially adapted for polishes, blackings, shoe dressings, etc. The body 1 is circular in shape and is provided about its periphery with a groove 3. In the groove 3 is located a support 4 formed of a piece of wire bent in a circular shape and extending substantially two-thirds the way around the body portion 1. The ends of the wire 4 are bent outwardly and backwardly as at 5 to form a suitable bearing and fulcrum point for a lever member 6. The lever member 6 is also formed of a piece of wire bent to form a handle portion 7. From the handle 7 the portions of the wire diverge and near their ends are bent to form loops 8, which loops engage the bent portions or loops 5 of the support 4. The wire forming the lever member 6 terminates in two ends 9 just beyond the loops 8, which ends are arranged to engage the underside or lip 10 of the cover 2.

When the receptacle and device are not in use they are arranged as shown in Fig. 1.

When it is desired to open the can or receptacle for use the lever member 6 is taken hold of by the handle portion 7 and pulled downwardly as shown in Figs. 2 and 3. This forces the ends 9 upwardly, the portions 5 and 8 acting as fulcrum points so that the ends 9 engage the lip 10 of the cover 2. Upon further downward movement of the handle 7 the ends 9 force or pry away the upper part or cover 2 of the receptacle as clearly shown in Figs. 4 and 5. The cover may then easily be removed by hand. The handle 7 is then moved farther about and upwardly so that the bent portions 11 of the lever member 6 will engage the groove 3 as clearly shown in Figs. 6 and 7. The parts are so constructed that the bent portions 11 will snap into the groove so that the lever member 6 and handle 7 will be held quite firm and rigid and locked relative to the body 1 of the receptacle and so that the handle 7 may serve as a handle for the receptacle while the same is in use.

The member 4 which supports the lever 6 is placed in the groove 3 so that it extends considerably more than halfway around the receptacle and clamps firmly about the body portion 1 with a spring pressure. To more firmly hold the support 4 upon the receptacle the lever member 6 is arranged to engage the member 4 substantially at its ends with a spring pressure so that the lever member tends to constrict the supporting wire 4 about the body portion 1 of the receptacle.

From the above it will appear that I have provided a receptacle opening device which is extremely simple, consisting merely of a wire support extending substantially two-thirds around one of the parts and adjustable thereon and a lever fulcrumed on the ends of said support and tending to hold the same more firmly thereon, the lever member being arranged to pry away the other part of the receptacle by means of the ends 9 and also having bent portions which engage the groove or depression 3 so as to cause the lever member to act as a handle for the receptacle when it is in use.

Although I have described my improvements in great detail nevertheless I do not desire to be limited to the various details shown and described since many modifications may be made within the spirit and scope of my invention by anyone skilled in the art.

But having fully and clearly described my invention what I claim as new and desire to secure by Letters Patent is:

1. In combination with a two part receptacle, a wire support extending substantially two-thirds around one of said parts and engaging the same with a spring pressure and adjustable thereon, a lever member formed of wire fulcrumed on said support and arranged to have its ends pry away the other of said parts.

2. In combination with a two part receptacle, a support suitably arranged on one of said parts, said part having a depression therein, a lever member fulcrumed on said support and arranged to pry away the other of said parts, said lever member being arranged to engage said depression to hold the member in position to act as a handle for the receptacle.

3. In combination with a two part receptacle, a support suitably arranged on one of said parts, said part having a depression therein, a wire lever member bent in a suitable manner to form a handle fulcrumed on said support and arranged to have its two ends pry away the other of said parts, said lever member being arranged to engage said depression to hold the member in position to act as a handle for the receptacle.

4. In combination with a two part receptacle, a groove in one of said parts a wire support extending more than half way around on one of said parts and lying in said groove, a wire lever member bent to form a handle and having extensions in opposite directions from the handle and fulcrumed on the support near the ends of said extensions, said lever member being arranged to pry the other of said parts and to engage said groove to hold the member in position to act as a handle for the receptacle.

5. In combination with a two part receptacle, a support suitably mounted on one of said parts, a wire lever member bent to form a handle and having projections extending in opposite directions about the receptacle from the handle and fulcrumed on the support near the ends of said projections, the ends of said wire lever member being arranged to engage the other of said parts to pry the same away.

6. In combination with a two part receptacle, a groove in one of said parts, a supporting member extending considerably more than half way around said part and lying in said groove, a lever member fulcrumed on the ends of said support and engaging the same with a spring pressure tending to constrict the support to more firmly hold the same on the receptacle, said lever member being arranged to pry away the other of said parts, and to engage said groove to hold the lever member in position to act as a handle for the receptacle.

7. In combination with a two part receptacle, a groove extending substantially around one of said parts, a suitable support extending considerably more than half way around said part and engaging said groove with a spring pressure, a lever member fulcrumed on said support and arranged to pry away the other of said parts, part of said lever member being arranged to engage said groove to hold the lever member in position to act as a handle for the receptacle.

8. In combination with a two part receptacle, a groove extending substantially around one of said parts, a suitable support extending considerably more than halfway around said part and engaging said groove with a spring pressure, a lever member fulcrumed on the ends of said support and arranged to engage the same with a spring pressure to more firmly hold the support in the groove and arranged to pry away the other of said parts, part of said lever member being arranged to engage said groove to hold the lever member in position to act as a handle for the receptacle.

9. In combination with a two part receptacle, a groove extending substantially around one of said parts, a suitable support extending considerably more than halfway around said part and engaging said groove with a spring pressure, a lever member fulcrumed on the ends of said support and arranged to engage the same with a spring pressure to more firmly hold the support in the groove and arranged to pry away the other of said parts, part of said lever member being arranged to engage said groove to hold the lever member in position to act as a handle for the receptacle, said lever member having two portions arranged.

In testimony whereof, I have signed my name to this specification, in the presence of two subscribing witnesses.

JOHN H. HOTSON.

Witnesses:
EDWIN SEGER,
GORHAM CROSBY.